(12) United States Patent
Park et al.

(10) Patent No.: US 9,245,325 B2
(45) Date of Patent: Jan. 26, 2016

(54) METHOD AND APPARATUS FOR GENERATING IMAGE

(71) Applicant: SAMSUNG ELECTRONICS CO., LTD., Suwon-si (KR)

(72) Inventors: Byung-kwan Park, Seoul (KR); Tae-yong Song, Hwaseong-si (KR); Jae-mock Yi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 13/904,522

(22) Filed: May 29, 2013

(65) Prior Publication Data

US 2014/0093134 A1  Apr. 3, 2014

(30) Foreign Application Priority Data

Sep. 28, 2012 (KR) .................. 10-2012-0109257

(51) Int. Cl.
   *G06K 9/00* (2006.01)
   *G06T 5/00* (2006.01)
   *G06T 11/00* (2006.01)

(52) U.S. Cl.
   CPC ............ *G06T 5/002* (2013.01); *G06T 11/005* (2013.01); *G06T 2211/412* (2013.01)

(58) Field of Classification Search
   None
   See application file for complete search history.

(56) References Cited

U.S. PATENT DOCUMENTS

| | | | |
|---|---|---|---|
| 6,415,049 B1 * | 7/2002 | Yanagita et al. | ............ 382/132 |
| 7,456,406 B2 | 11/2008 | Cho et al. | |
| 7,705,314 B2 | 4/2010 | Cook et al. | |
| 7,831,097 B2 | 11/2010 | Chen et al. | |
| 8,144,962 B2 | 3/2012 | Busch et al. | |
| 8,184,887 B2 | 5/2012 | Khare et al. | |
| 2003/0108229 A1 | 6/2003 | Tanaka et al. | |
| 2005/0123089 A1 * | 6/2005 | Man | ................. 378/4 |
| 2008/0246724 A1 * | 10/2008 | Pan et al. | ...................... 345/157 |
| 2010/0054561 A1 * | 3/2010 | Khare et al. | ................. 382/131 |
| 2010/0215242 A1 * | 8/2010 | Ziegler et al. | ................ 382/132 |
| 2011/0142311 A1 | 6/2011 | Felsberg | |
| 2011/0228897 A1 * | 9/2011 | Kobayashi | ........................ 378/8 |

FOREIGN PATENT DOCUMENTS

| | | |
|---|---|---|
| JP | 2001-037750 A | 2/2001 |
| JP | 2002-058665 A | 2/2002 |
| KR | 10-0763808 B1 | 10/2007 |
| KR | 10-2011-0045319 A | 5/2011 |
| KR | 10-2011-0097670 A | 8/2011 |
| KR | 10-1065838 B1 | 9/2011 |
| KR | 10-1082629 B1 | 11/2011 |
| KR | 10-1118549 B1 | 2/2012 |
| KR | 10-1128566 B1 | 3/2012 |

* cited by examiner

*Primary Examiner* — Amara Abdi
(74) *Attorney, Agent, or Firm* — NSIP Law (57) ABSTRACT

A method and an apparatus for generating images are provided. The method includes generating a first sinogram for a state of an object from among states of the object based on a motion of the object, and a second sinogram for the states, based on data obtained from the object, and determining a region of interest (ROI) of the object based on the first sinogram. The method further includes extracting, from the second sinogram, third sinograms corresponding to the ROI, and estimating motion information of the ROI based on the third sinograms. The method further includes correcting the data based on the motion information.

19 Claims, 6 Drawing Sheets

METHOD AND APPARATUS FOR GENERATING IMAGE

CROSS-REFERENCE TO RELATED APPLICATIONS

This application claims the benefit under 35 U.S.C. §119(a) of Korean Patent Application No. 10-2012-0109257, filed on Sep. 28, 2012, in the Korean Intellectual Property Office, the entire disclosure of which is incorporated herein by reference for all purposes.

BACKGROUND

1. Field

The following description relates to methods and apparatuses for generating images.

2. Description of the Related Art

A diagnostic image of an object may be obtained by using gamma rays emitted from radioactive isotopes injected into the object, or may be obtained by emitting radioactive rays, such as X-rays, to the object and measuring an amount of the radioactive rays absorbed by the object. However, noise may be present in the diagnostic image due to a motion of the object while the diagnostic image of the object is obtained.

SUMMARY

In one general aspect, there is provided a method of generating an image, the method including generating a first sinogram for a state of an object from among states of the object based on a motion of the object, and a second sinogram for the states, based on data obtained from the object, and determining a region of interest (ROI) of the object based on the first sinogram. The method further includes extracting, from the second sinogram, third sinograms corresponding to the ROI, and estimating motion information of the ROI based on the third sinograms. The method further includes correcting the data based on the motion information.

In another general aspect, there is provided a method of generating an image, the method including generating a gated image based on data obtained from an object, and determining a region of interest (ROI) of the object based on the gated image. The method further includes estimating motion information of the ROI based on sinograms corresponding to the ROI, and correcting the data based on the motion information. The method further includes generating the image based on the corrected data.

In still another general aspect, there is provided an apparatus configured to generate an image, the apparatus including a sinogram generating unit configured to generate a first sinogram for a state of an object from among states of the object based on a motion of an object, and a second sinogram for the states, based on data obtained from the object, and a region of interest (ROI) determining unit configured to determine an ROI of the object based on the first sinogram. The apparatus further includes a sinogram extracting unit configured to extract, from the second sinogram, third sinograms corresponding to the ROI, and a motion information extracting unit configured to estimate motion information of the ROI based on the third sinograms. The apparatus further includes a correction unit configured to correct the data based on the motion information.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
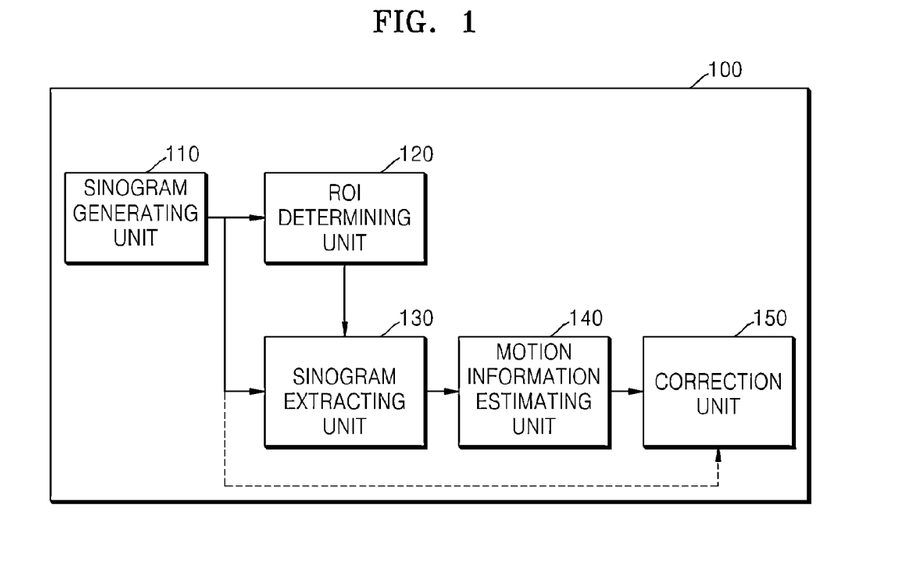
FIG. 1 is a block diagram illustrating an example of an apparatus configured to correct a motion of an object.

FIG. 1 is a block diagram illustrating an example of an apparatus 100 configured to correct a motion of an object. Referring to FIG. 1, the apparatus 100 includes a sinogram generating unit 110, a region of interest (ROI) determining unit 120, a sinogram extracting unit 130, a motion information estimating unit 140, and a correction unit 150.

Figure 7:
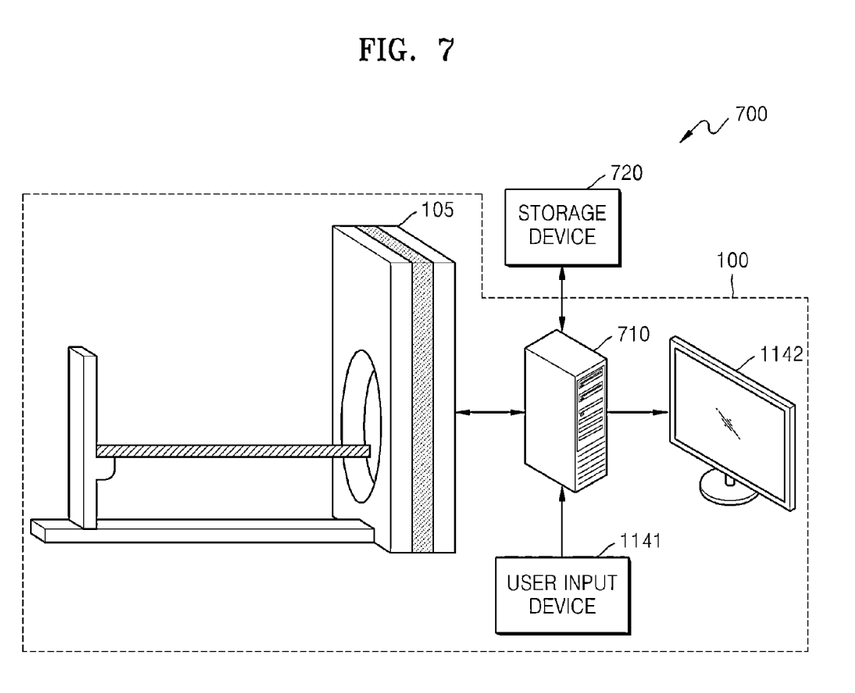
FIG. 7 is a perspective view illustrating an example of an apparatus configured to generate an image of an object.

Only elements of the apparatus 100 related to the example are illustrated in FIG. 1. Accordingly, it would be understood by one of ordinary skill in the art that general-purpose elements other than the elements illustrated in FIG. 1 may be further included in the apparatus 100. Each of the apparatus 100 and the elements of the apparatus 100 of FIG. 1 may correspond to a processor or processors. Also, the apparatus 100 may operate by being included in an apparatus configured to generate an image of the object as shown in the example of FIG. 7.

Referring to FIG. 1, the apparatus 100 removes, from data obtained from the object, noise (e.g., a motion artifact) generated due to the motion of the object. Also, the apparatus 100 removes, from the image of the object, motion blur generated due to the motion of the object. Examples of the object may include a human body, a human internal organ, an organ, and a tissue. Examples of the human internal organ may include a liver, a lung, and a heart. If the object is a human internal organ, the object generates a periodic motion. Examples of the periodic motion may include a respiratory motion due to respiration and a motion due to pulsation.

For example, the apparatus 100 may correct the data generated by a positron emission tomography (PET), a computed tomography (CT), a PET/CT, a single photon emission computed tomography (SPECT), and/or a SPECT/CT. However, the example of FIG. 1 is not limited thereto, and the apparatus 100 may correct the data generated by any of methods of generating an image by using a sinogram.

Figure 3:
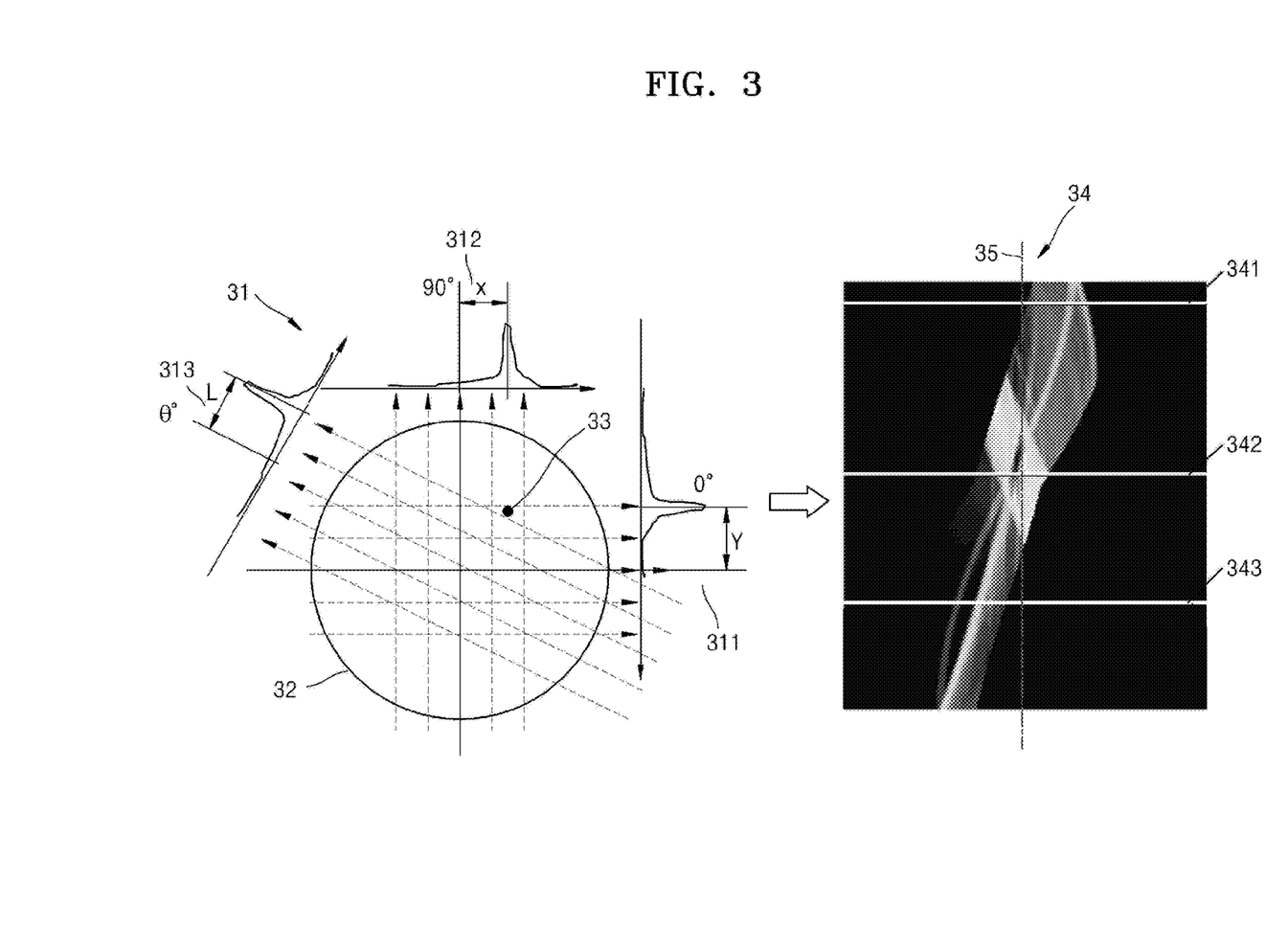
FIG. 3 is a diagram illustrating an example of a method of estimating first motion information indicating a motion degree of a region of interest (ROI) of an object in a first direction and a second direction.

The sinogram generating unit 110 generates a sinogram based on the data obtained from the object. For example, the sinogram generating unit 110 may generate the sinogram by sequentially arranging pieces of projection data obtained from the object in projection directions. As such, the sinogram generating unit 110 may generate the sinogram by converting measurement data obtained from the object into data for a projection angle and a displacement as shown in the example of FIG. 3.

If the data is generated by a PET, a tracer is injected into the object, and a positron emitted from the tracer combines with an electron and then is annihilated to generate two gamma rays. For example, each of the two gamma rays may include energy of about 511 keV, and may be emitted at about 180° to each other. Examples of the tracer may include a radioactive isotope, a radioactive tracer, and a radioactive isotope tracer.

The sinogram generating unit 110 may obtain the two gamma rays, or may obtain line-of-response (LOR) data including information about the two gamma rays. For example, the LOR data may include an angle at which the two gamma rays are incident on a detector of the sinogram generating unit 110, a distance between a point from which the two gamma rays are emitted and the detector, and a time at which the two gamma rays are detected. The angle at which the two gamma rays are incident on the detector may be the projection angle of the measurement data obtained from the object. The distance between the point from which the gamma rays are emitted and the detector may be the displacement of the measurement data obtained from the object. That is, the sinogram generating unit 110 obtains raw data, such as the two gamma rays or the LOR data, from the object, and generates the sinogram based on the raw data.

The sinogram generating unit 110 generates a first sinogram for any state of the object from among states of the object based on the motion of the object, and a second sinogram for the states of the object. The first sinogram is a gated sinogram, and the second sinogram is a full sinogram.

If the first sinogram for any state of the object from among the states of the object based on a respiratory motion of the object is generated, the states of the object are substantially similarly repeated after a respiration cycle of the object. That is, the states of the object are at times measured at predetermined time intervals in the respiration cycle of the object. For example, if each of the predetermined time intervals is 1 second, the states of the object are at 1 second, 2 seconds, 3 seconds, 4 seconds, and 5 seconds in the respiration cycle of the object of 5 seconds. In this example, if the respiration cycle of the object is about 1 cycle/5 seconds, the states of the object are substantially similar to one another at 1 second, 6 seconds, and 11 seconds, and are substantially similar to one another at 2 seconds, 7 seconds, and 12 seconds.

The sinogram generating unit 110 generates the first sinogram for the state of the object based on the data obtained from the object. For example, the sinogram generating unit 110 may obtain time information about the state of the object, and may generate the first sinogram based on the data corresponding to the time information. The time information may be obtained via a device that contacts or does not contact the object, or based on the data obtained from the object. Time information about the states of the object based on the motion of the object may be, for example, gating information.

For example, if the time information about the state of the object is obtained via the device that contacts the object, the sinogram generating unit 110 may use electrocardiogram (ECG) information and/or an infrared (IR) tracker. Alternatively, the sinogram generating unit 110 obtains a signal indicating the time information about the states of the object, and generates the first sinogram based on the data corresponding to a time at which the signal includes a predetermined phase from among the data obtained from the object.

Alternatively, if the time information about the state of the object is obtained based on the data obtained from the object without using an external device, the sinogram generating unit 110 generates sinograms corresponding to times measured at predetermined time intervals, and generates the first sinogram based on a predetermined number of sinograms whose similarities are high from among the sinograms. The sinograms whose similarities are high are sinograms of the same state of the object. Accordingly, the first sinogram may be generated by extracting the predetermined number of the sinograms whose similarities are high from among the sinograms and merging the extracted sinograms into the first sinogram, or based on the data obtained from the object that corresponds to time information obtained from the predetermined number of the sinograms whose similarities are high from among the sinograms.

In addition, the sinogram generating unit 110 may generate a sinogram for each of data obtained at N second intervals from among the data obtained from the object. For example, if N is 1, the sinogram generating unit 110 generates sinograms for each of the data obtained at 1 second intervals from among the data obtained from the object, for example, a sinogram for the data obtained at 1 second and a sinogram for the data obtained at 2 seconds.

Also, the sinogram generating unit 110 may extract the sinograms whose similarities are high from among the sinograms by comparing the sinograms generated at predetermined second intervals. For example, if the respiration cycle of the object is about 1 cycle/5 seconds, similarities of the sinograms for the data obtained at 5 second intervals are the highest. As discussed above, the sinogram generating unit 110 may generate the first sinogram by extracting the predetermined number of the sinograms whose similarities are high from among the sinograms and merging the extracted sinograms into the first sinogram.

Alternatively, as discussed above, the sinogram generating unit 110 may generate the first sinogram by obtaining the time information from the predetermined number of the sinograms whose similarities are high from among the sinograms, and by using data obtained from the object that corresponds to the obtained time information. For example, if three sinograms whose similarities are high from among the sinograms are sinograms for the data obtained from the object at 1 second, 6 seconds, and 12 seconds, respectively, the time information obtained from the three sinograms whose similarities are high may be 1 second, 6 seconds, and 12 seconds, respectively.

As such, the sinogram generating unit 110 may obtain the time information about the states of the object based on the data obtained from the object without using a device that contacts or does not contact the object. Accordingly, the sinogram generating unit 110 is prevented from obtaining time information from the device that is not exactly the same as the time information of the object.

The ROI determining unit 120 determines an ROI of the object based on the first sinogram. For example, the ROI may include a lesion included in the object. The ROI determining unit 120 may determine the ROI based on a first image restored from the first sinogram. The ROI may be manually determined by a medical specialist using the apparatus 100, or may be automatically determined by the apparatus 100.

In more detail, the ROI determining unit 120 may determine the ROI further based on selection information input from a user who views the first image restored from the first sinogram. The user may determine the ROI by using a mouse to drag over and select a predetermined region of the first image displayed on a user interface unit of the apparatus 100.

Alternatively, the ROI determining unit 120 may automatically determine the ROI based on image values of pixels constituting the first image restored from the first sinogram. For example, the ROI determining unit 120 may determine pixels including image values greater than or equal to a predetermined threshold value from among the pixels constituting the first image, as the ROI. In another example, the ROI determining unit 120 may determine a predetermined number or more of the pixels including the image values greater than or equal to the predetermined threshold value from among the pixels constituting the first image, which are continuously displayed, as the ROI.

As such, the ROI determining unit 120 determines the ROI of the object based on only the first sinogram for the state of the object from among the states of the object. Accordingly, the ROI may not include organs other than the lesion, and an accuracy of the ROI may be increased.

Figure 4:
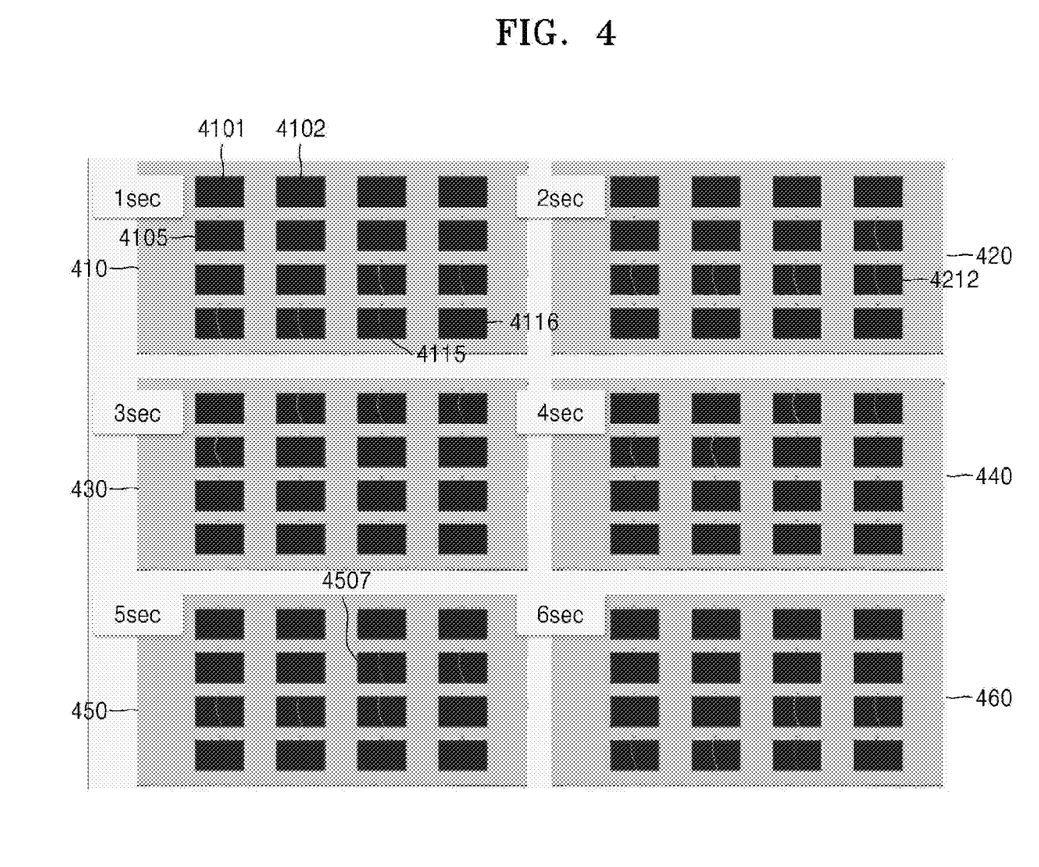
FIG. 4 is a diagram illustrating an example of a method of estimating second motion information indicating a motion degree of a ROI of an object in a third direction.

The sinogram extracting unit 130 extracts, from the second sinogram, third sinograms corresponding to the ROI. In an example, the sinogram extracting unit 130 may extract, from the second sinogram, raw data of a portion corresponding to the ROI (e.g., LOR data), and may extract, from the second sinogram, the third sinograms based on the raw data. In another example, the sinogram extracting unit 130 may mask, in the second sinogram, the portion corresponding to the ROI, and may extract, from the second sinogram, the third sinograms based on a result of the masking. The third sinograms include a stack of two-dimensional (2D) sinograms for the respective states of the object based on the motion of the object. The third sinograms are illustrated in the example of FIG. 4.

The motion information estimating unit 140 estimates motion information indicating a motion degree of the ROI based on the third sinograms corresponding to the ROI. The motion information estimating unit 140 estimates the motion information by comparing sinograms corresponding to respective different states of the object from among the third sinograms.

Since the ROI includes the lesion, and the lesion may be small in size and rigid, the lesion may appear hardly deformed due to the motion of the object, compared to other organs around the lesion. Accordingly, the motion information estimating unit 140 estimates the motion information indicating the motion degree of the ROI based on only the third sinograms corresponding to the ROI. As such, an amount of calculation may be decreased, and an estimation accuracy may be increased, in comparison to estimating motion information of a whole object.

As discussed above, the third sinograms are for the respective states of the object. As such, the ROI is determined based on the gated first sinogram, and the motion degree of the ROI is estimated based on the third sinograms for the respective states of the object. Accordingly, an estimation accuracy may be increased in comparison to estimating motion information based on only a gated sinogram or a gated image for a state of the object.

In an example, if the ROI of the object is determined to be a predetermined region defined by x-, y-, and z-axes of an image space, the motion information estimating unit 140 estimates first motion information indicating the motion degree of the ROI along the x-axis and the y-axis, and second motion information indicating the motion degree of the ROI along the z-axis. The x-, y-, and z-axes are examples, and the example of FIG. 1 is not limited thereto. Accordingly, the motion information estimating unit 140 may estimate the motion information in a first direction, a second direction, and a third direction based on another coordinate system, or by changing an order of the x-, y-, and z-axes in relation to the motion information.

The motion information estimating unit 140 estimates the first motion information indicating the motion degree of the ROI in the first direction and the second direction by comparing an eleventh sinogram with a twelfth sinogram. The eleventh sinogram corresponds to a first state of the object from among the states of the object based on the motion of the object, and includes a first coordinate value in the third direction. The twelfth sinogram corresponds to a second state of the object from among the states of the object based on the motion of the object, and includes the first coordinate value in the third direction. The eleventh and twelfth sinograms are from among the third sinograms. This will be explained below with reference to the example of FIG. 3.

If the second motion information is estimated, the motion information estimating unit 140 estimates the second motion information indicating the motion degree of the ROI in the third direction by comparing a twenty-first sinogram with a twenty-second sinogram. The twenty-first sinogram corresponds to the first state of the object from among the states of the object based on the motion of the object. The twenty-second sinogram is the most similar to the twenty-first sinogram from among sinograms corresponding to states of the object other than the first state from among the states of the object. The twenty-first and twenty-second sinograms are from among the third sinograms. This will be explained below with reference to the example of FIG. 4.

The correction unit 150 performs a correction process on the data obtained from the object based on the motion information. That is, when the motion information about each of the states of the object based on the motion of the object is estimated, the correction unit 150 performs the correction process on each of the states of the object. When the correction process is based on the first state of the object from among the states of the object, the correction unit 150 performs the correction process by reflecting (i.e., removing) the motion information about the second state of the object based on the first state of the object, reflecting the motion information about a third state of the object based on the first state of the object, and reflecting the motion information about any other state of the object based on the first state of the object. Due to the correction process of the correction unit 150, the apparatus 100 generates a diagnostic image from which noise due to the motion of the object from a standard state (e.g., the first state) is removed.

For example, the correction unit 150 may correct the second sinogram based on the motion information. Accordingly, a corrected sinogram may be generated by the sinogram generating unit 110 based on data generated by the correction process of the correction unit 150, or may be generated by the correction unit 150 that corrects the second sinogram.

Alternatively, the correction unit 150 may correct a second image restored from the second sinogram. Alternatively, the correction unit 150 may perform the correction process by reflecting (i.e., removing) the motion information in a system matrix of the apparatus 100. The system matrix may indicate a point spread function (PSF) used by the apparatus 100 to restore the second sinogram into the second image of the object.

Accordingly, the apparatus 100 estimates the motion information based on raw data (e.g., a sinogram) instead of a restored image of the object. As such, the method of estimating the motion information may be simplified. Also, since the apparatus 100 estimates the motion information based on the ROI of the object instead of a whole area of the object, an estimation accuracy may be increased.

Figure 2:
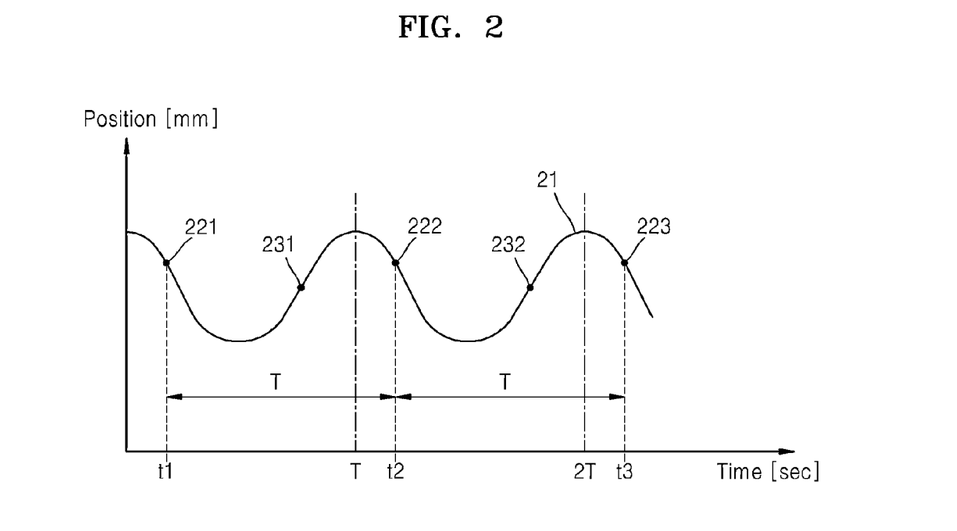
FIG. 2 is a graph illustrating an example of a signal indicating time information about each of states of an object based on a motion of the object.

FIG. 2 is a graph illustrating an example of a signal indicating time information about each of states of an object based on a motion of the object. A respiratory motion of the object is illustrated in the example of FIG. 2, but the example is not limited thereto.

Referring to FIG. 2, a signal 21 indicates the time information about each of the states of the object based on the motion (i.e., position) of the object. The signal 21 may be obtained from a device that contacts or does not contact the object.

In more detail, the states of the object based on the motion of the object correspond to phases of the signal 21. For example, a first state of the object based on the motion of the object corresponds to a first point 221 in a first cycle (from a first time t1 to a second time t2 and including a period T). A second point 222 in a second cycle (from the second time t2 to a third time t3 and including the period T) and a third point 223 in a third cycle (from the third time t3) that include the same phase as that of the first point 221, also correspond to the first state. Also, points 231 and 232 in the first and second cycles, respectively, that include the same phase, correspond to a second state of the object based on the motion of the object. In the same manner, points in respective cycles that include the same phase, correspond to a same state of the object from among the states of the object based on the motion of the object.

Referring to FIGS. 1 and 2, the sinogram generating unit 110 generates the first sinogram for the first state of the object from among the states of the object based on the motion of the object, based on data corresponding to times at which the signal 21 includes a predetermined phase from among data obtained from the object. That is, the sinogram generating unit 110 generates the first sinogram based on the data corresponding to the first time t1 corresponding to the first point 221, the second time t2 corresponding to the second point 222, and the third time t3 corresponding to the third point 223, from among the data obtained from the object. For example, the data corresponding to the first time t1 indicates data obtained from the object at the first time t1. Each of a time interval between the first time t1 and the second time t2, and a time interval between the second time t2 and the third time t3, are substantially similar to a cycle (including the period T) of the signal 21.

As such, the timing information about each of the states of the object based on the motion of the object, may be obtained from the signal 21, and the sinogram generating unit 110 generates the first sinogram based on the data corresponding to the timing information. However, the example of FIG. 2 is not limited thereto, and the sinogram generating unit 110 may generate the first sinogram by extracting the first sinogram corresponding to the timing information from the second sinogram for the states of the object. Accordingly, since the first sinogram is generated based on the data corresponding to the same state of the object, a first image restored from the first sinogram may not include motion blur, and an accuracy of determining the ROI of the object may be increased.

FIG. 3 is a diagram illustrating an example of a method of estimating first motion information indicating a motion degree of a ROI of an object in a first direction and a second direction. The first direction is along a x-axis, and the second direction is along a y-axis. Referring to FIG. 3, an image space 31, a detector 32, and a sinogram 34 are illustrated.

The detector 32 obtains measurement data from a first region 33 that exists at any point of the object. The measurement data may include, for example, radioactive rays passing through the object, such as X-rays. However, the example of FIG. 3 is not limited thereto, and the measurement data may include gamma rays emitted as a positron and an electron are combined with each other and then are annihilated. Also, the first region 33 may be, for example, the ROI including a lesion.

If the measurement data includes radioactive rays passing through the object, a first graph 311 illustrates an amount of the radioactive rays absorbed by the object when the radioactive rays including a projection angle of 0° are emitted to the object. A second graph 312 illustrates an amount of the radioactive rays absorbed by the object when the radioactive rays including a projection angle of 90° is emitted to the object. A third graph 313 illustrates an amount of the radioactive rays absorbed by the object when the radioactive rays including a projection angle of θ° is emitted to the object.

In each of the first through third graphs 311 through 313, a portion corresponding to the first region 33 of the object absorbs more of the radioactive rays than other regions of the object. Accordingly, in the first graph 311, a distance between the portion corresponding to the first region 33 and the x-axis indicates a y-coordinate value of the first region 33. In the second graph 312, a distance between the portion corresponding to the first region 33 and the y-axis indicates an x-coordinate value of the first region 33.

The sinogram 34 visually shows a height of each of the first through third graphs 311 through 313 obtained for the respective projection angles at a corresponding position along a central axis 35 by using shading. For example, as the height of the corresponding graph increases, and the amount of the radioactive rays absorbed by the object increases, the sinogram 34 is brighter.

The sinogram 34 includes a first line 341 generated corresponding to the first graph 311 and the projection angle of 0°, a second line 342 generated corresponding to the second graph 312 and the projection angle of 90°, and a third line 343 generated corresponding to the third graph 313 and the projection angle of θ°. The x-coordinate value of the first region 33 indicates a distance between a brightest point of the second line 342 and the central axis 35, and the y-coordinate value of the first region 33 indicates a distance between a brightest point of the first line 341 and the central axis 35.

Referring to FIGS. 1 and 3, since the ROI including the lesion indicates a brightest portion in the sinogram 34, the motion information estimating unit 140 of FIG. 1 obtains position information of the ROI based on data corresponding to the first graph 311 and the projection angle of 0° (i.e., the first line 341), and data corresponding to the second graph 312 and the projection angle of 90° (i.e., the second line 342), of the sinogram 34.

The motion information estimating unit 140 estimates the first motion information by comparing the eleventh sinogram with the twelfth sinogram. In more detail, the motion information estimating unit 140 extracts sinograms corresponding to the first state and the second state, respectively, from among the states based on the motion of the object, from among the third sinograms corresponding to the ROI. The sinograms corresponding to the first state include different z-coordinate values, and the sinograms corresponding to the second state include different z-coordinate values.

The motion information estimating unit 140 extracts the eleventh sinogram including a first z-coordinate value from among the sinograms corresponding to the first state, and extracts the twelfth sinogram including the first z-coordinate value from among the sinograms corresponding to the second state. The motion information estimating unit 140 obtains eleventh position information from the eleventh sinogram, and obtains twelfth position information from the twelfth sinogram.

The eleventh position information includes a brightest point from among points corresponding to a first projection angle, and a brightest point from among points corresponding to a second projection angle that includes a difference of 90° from the first projection angle, of the eleventh sinogram. The eleventh position information may include a distance between the brightest point from among the points corresponding to the first projection angle, and a central axis, of the eleventh sinogram, and a distance between the brightest point from among the points corresponding to the second projection angle, and the central axis, of the eleventh sinogram.

The twelfth position information includes a brightest point from among points corresponding to the first projection angle, and a brightest point from among points corresponding to the second projection angle that includes the difference of 90° from the first projection angle, of the twelfth sinogram. The twelfth position information may include a distance between the brightest point from among the points corresponding to the first projection angle, and a central axis, of the twelfth sinogram, and a distance between the brightest point from among the points corresponding to the second projection angle, and the central axis, of the twelfth sinogram.

For example, if the first projection angle is 90° and the second projection angle is 0°, the eleventh position information includes an x-axis coordinate value and a y-axis coordinate value of the ROI when the object is in the first state. Meanwhile, the twelfth position information includes an x-axis coordinate value and a y-axis coordinate value of the ROI when the object is in the second state.

In another example, if the first projection angle is not an angle (for example, 90°) along the x-axis, and the second projection angle is not an angle (for example, 90°) along the y-axis, the motion information estimating unit 140 obtains position information by performing a rotation process. In this example, if the first projection angle is (θ±90)° and the second projection angle is θ°, the eleventh position information corresponding to the x-axis coordinate value is obtained by rotating, by −θ°, a distance between a brightest point from among points corresponding to (θ±90)°, and a central axis, of the eleventh sinogram. Meanwhile, the eleventh position information corresponding to the y-axis coordinate value is obtained by rotating, by −θ°, a distance between a brightest point form among points corresponding to θ°, and the central axis, of the eleventh sinogram. The twelfth position information is obtained in the same manner.

The motion information estimating unit 140 compares (i.e., determines a difference between) the eleventh position information with the twelfth position information. The motion information estimating unit 140 estimates the first motion information indicating the motion degree of the ROI along the x-axis and the y-axis based on a result of the comparison.

Also, the motion information estimating unit 140 may perform an additional process in order to increase an accuracy of the position information of the ROI. For example, the motion information estimating unit 140 may obtain pieces of position information of the ROI from the eleventh sinogram based on respective projection angle pairs, each of which including a difference of 90° therebetween. The motion information estimating unit 140 may obtain the eleventh position information based on the pieces of the position information.

In an example, if there are 2 projection angle pairs, a first projection angle pair may include a first projection angle of 135° and a second projection angle of 45°, and a second projection angle pair may include a first projection angle of 90° and a second projection angle of 0°. In this example, the motion information estimating unit 140 may obtain the pieces of the position information based on the respective first and second projection angle pairs, and may obtain the eleventh position information based on the pieces of the position information. The motion information estimating unit 140 may obtain the eleventh position information by calculating an average of the pieces of the position information obtained based on the respective first and the second projection angle pairs.

Also, the motion information estimating unit 140 may obtain the twelfth position information in the same manner. Accordingly, if the motion information estimating unit 140 estimates the eleventh and twelfth position information based on pieces of data, an accuracy of the position information of the ROI may be increased.

FIG. 4 is a diagram illustrating an example of a method of estimating second motion information indicating a motion degree of a ROI of an object in a third direction. The third direction is along a z-axis. Referring to FIG. 4, sinograms (e.g., the third sinograms of FIG. 1) corresponding to the ROI are illustrated. In more detail, sinograms 410 correspond to a first state of the object (i.e., at 1 second), sinograms 420 correspond to a second state of the object (i.e., at 2 seconds), . . . , and sinograms 460 correspond to a sixth state of the object (i.e., at 6 seconds), from among states of the object based on a motion of the object.

The sinograms 410 corresponding to the first state include different coordinate values in the third direction. The sinograms 410 corresponding to the first state include a sinogram 4101 including a first z-coordinate value, a sinogram 4102 including a second z-coordinate value, . . . , a sinogram 4105 including a fifth z-coordinate value, . . . , a sinogram 4115 including a fifteenth z-coordinate value, and a sinogram 4116 including a sixteenth z-coordinate value. As such, each of the sinograms 410 through 460 includes 16 individual sinograms corresponding to a respective state of the object.

Referring to FIGS. 1 and 4, the motion information estimating unit 140 estimates the second motion information indicating the motion degree of the ROI in the third direction by comparing the twenty-first sinogram with the twenty-second sinogram. The twenty-first sinogram may be any one of the sinograms 410 corresponding to the first state. The twenty-second sinogram is the most similar to the twenty-first sinogram from among the sinograms 420 through 460 corresponding to states of the object other than the first state from among states of the object. In more detail, the motion information estimating unit 140 estimates the second motion information by comparing a coordinate value of the twenty-first sinogram in the third direction, with a coordinate value of the twenty-second sinogram in the third direction.

For example, the motion information estimating unit 140 may estimate the second motion information indicating the motion degree of the ROI along the z-axis by comparing a twenty-first sinogram 4115 with a twenty-second sinogram 4507. The twenty-first sinogram 4115 is one of the sinograms 410 corresponding to the first state. The twenty-second sinogram 4507 is the most similar from among the sinograms 420 through 460 corresponding to the second through sixth states. In this case, the second motion information may be a difference between the fifteenth z-coordinate value of the twenty-first sinogram 4115, and a z-coordinate value of the twenty-second sinogram 4507.

The example is not limited thereto. In another example, the motion information estimating unit 140 may estimate the second motion information indicating the motion degree of the ROI along the z-axis by comparing the twenty-first sinogram 4115 with a twenty-second sinogram 4212. The twenty-second sinogram 4212 is the most similar from among the sinograms 420 corresponding to the second state. In this case, the second motion information may be a difference between the fifteenth z-coordinate value of the twenty-first sinogram 4115, and a z-coordinate value of the twenty-second sinogram 4212.

Accordingly, the motion information indicating the motion degree of the ROI along the z-axis based on the states of the object based on the motion of the object may be accurately estimated.

Figure 5:
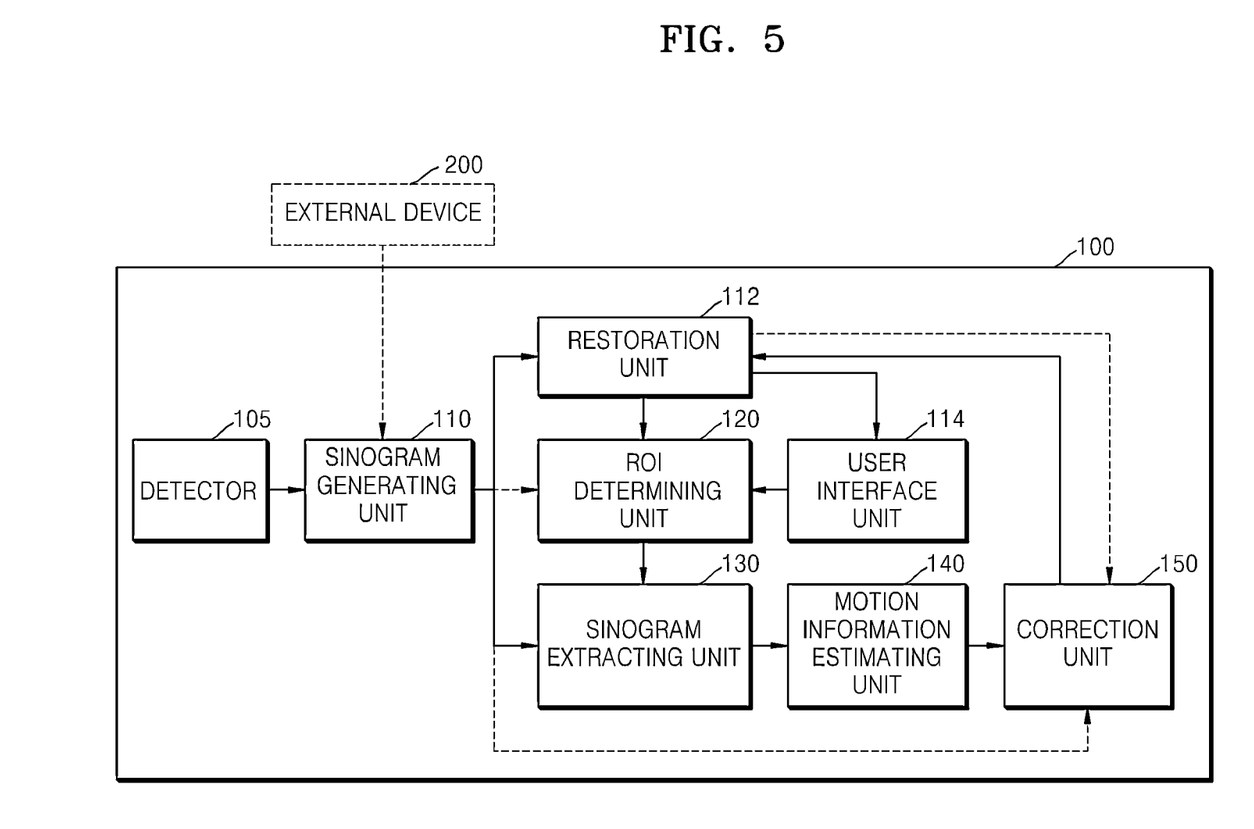
FIG. 5 is a block diagram illustrating another example of an apparatus configured to correct a motion of an object.

FIG. 5 is a block diagram illustrating another example of the apparatus 100 configured to correct the motion of the object. Referring to FIG. 5, the apparatus 100 includes a detector 105, the sinogram generating unit 110, a restoration unit 112, a user interface unit 114, the ROI determining unit 120, the sinogram extracting unit 130, the motion information estimating unit 140, and the correction unit 150.

The apparatus 100 of FIG. 5 is another example of the apparatus 100 of FIG. 1. Accordingly, since the description made with respect to the apparatus 100 of FIG. 1 may apply to the apparatus 100 of FIG. 5, a repeated explanation of the apparatus 100 of FIG. 1 will be omitted. Also, the apparatus 100 of FIG. 5 is not limited to elements illustrated in FIG. 5.

The detector 105 detects measurement data from the object. For example, the detector 105 may detect radioactive rays passing through the object, or gamma rays emitted from the object.

The sinogram generating unit 110 generates a sinogram based on the measurement data detected from the object. For example, the sinogram generating unit 110 generates a first sinogram and/or a second sinogram as described above with respect to FIG. 1.

If the first sinogram is generated, the sinogram generating unit 110 may obtain, from an external device 200, a signal indicating time information about states of the object. For example, the external device 200 may include a device that contacts the object or a device that does not contact the object. Examples of the device that contacts the object may include a pressure sensor and a temperature sensor. Example of the device that does not contact the object may include a laser displacement sensor and an optical tracking device. The sinogram generating unit 110 may obtain the time information about the states of the object without obtaining the signal from the external device 200, and accordingly, the external device 200 may be omitted.

The restoration unit 112 restores an image from the sinogram generated by the sinogram generating unit 110. For example, the restoration unit 112 restores a first image from the first sinogram, restores a second image from the second sinogram, and/or generates a corrected image based on a result of performing a correction process on an image or a sinogram.

The user interface unit 114 obtains input information from a user, and displays output information. For example, the user interface unit 114 displays the first image, the second image, and/or the corrected image, and receives, from the user, selection information that selects an ROI of the object. The user interface unit 114 may include an input/output device, such as a display panel, a mouse, a keyboard, a touchscreen, a monitor, and/or a speaker, and a software module configured to drive the input/output device.

As described above with respect to FIG. 1, the ROI determining unit 120 determines the ROI of the object based on the first sinogram, and extracts, from the second sinogram, third sinograms corresponding to the ROI. The motion information estimating unit 140 estimates motion information indicating a motion degree of the ROI based on the third sinograms. The correction unit 150 performs a correction process on the data obtained from the object (e.g., the second sinogram) based on the motion information.

Accordingly, the apparatus 100 may obtain a gated image from the object, determine a ROI of the object based on the gated image, estimate motion information indicating a motion degree of the ROI based on sinograms corresponding to the ROI, and generate a diagnostic image in which a correction process has been performed. In this example, the gated image may be the first image restored from the first sinogram, and the diagnostic image may be the corrected image.

Figure 6:
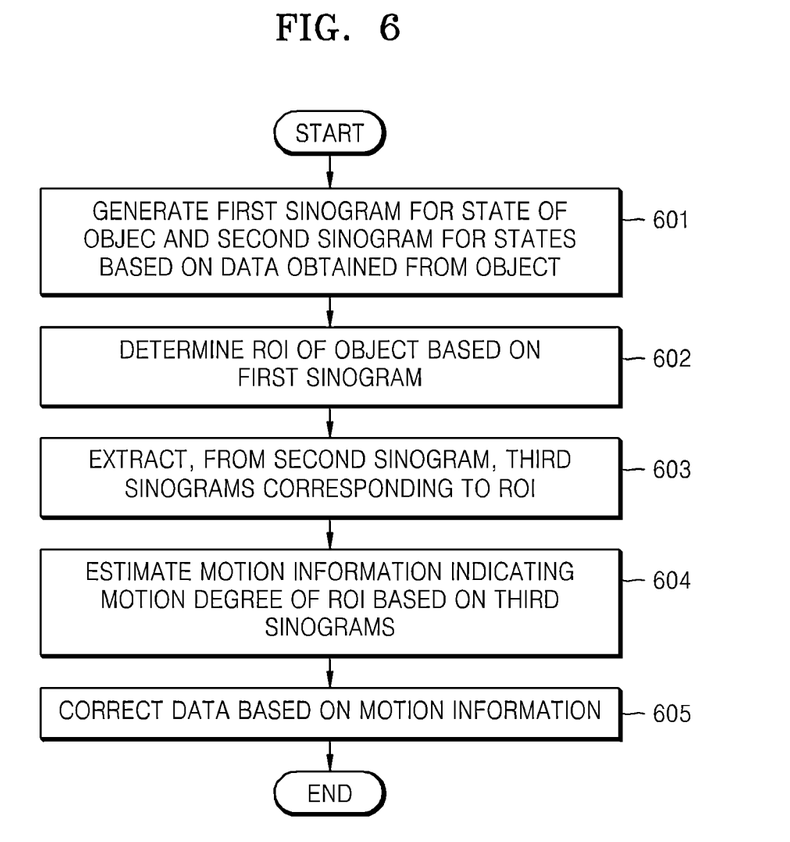
FIG. 6 is a flowchart illustrating an example of a method of correcting a motion of an object.

FIG. 6 is a flowchart illustrating an example of a method of correcting a motion of an object. Referring to FIG. 6, the method includes operations sequentially performed by the apparatus 100 of any of FIGS. 1 and 5. Accordingly, the description made with respect to the apparatus 100 of any of FIGS. 1 and 5 may apply to the method of FIG. 6. The method of FIG. 6 may apply to a method of generating an image based on the correcting of the motion.

In operation 601, the sinogram generating unit 110 generates a first sinogram for any state of the object from among states of the object based on the motion of the object, based on data obtained from the object. The sinogram generating unit 110 also generates a second sinogram for the states based on the data obtained from the object.

In operation 602, the ROI determining unit 120 determines an ROI of the object based on the first sinogram.

In operation 603, the sinogram extracting unit 130 extracts, from the second sinogram, third sinograms corresponding to the ROI.

In operation 604, the motion information estimating unit 140 estimates motion information indicating a motion degree of the ROI based on the third sinograms.

In operation 605, the correction unit 150 corrects the data (e.g., the second sinogram) based on the motion information.

Accordingly, since noise due to the motion of the object is efficiently removed from, e.g., the second sinogram, a diagnostic image, such as a PET diagnostic image, a CT diagnostic image, a PET/CT diagnostic image, an SPECT diagnostic image, and/or an SPECT/CT diagnostic image, that includes a high signal-to-noise ratio (SNR) may be generated. Also, since the motion is corrected based on a sinogram, a processing time may be decreased. Further, since the motion is corrected by extracting a sinogram of a ROI, an accuracy may be increased.

FIG. 7 is a perspective view illustrating an example of an apparatus 700 configured to generate an image of an object. Referring to FIG. 7, the apparatus 700 includes the apparatus 100 and a storage device 720. The apparatus 100 includes the detector 105, a main system 710, a user input device 1141, and an output device 1142.

Only elements of the apparatus 700 related to the example are illustrated in FIG. 7. Accordingly, it would be understood by one of ordinary skill in the art that general-purpose elements other than the elements illustrated in FIG. 7 may be included in the apparatus 700.

Also, the apparatus 100 of FIG. 7 is an example of the apparatus 100 of any of FIGS. 1 and 5. Accordingly, since the description made with respect to the apparatus 100 of any of FIGS. 1 and 5 may apply to the apparatus 100 of FIG. 7, a repeated explanation of the apparatus 100 of any of FIGS. 1 and 5 will be omitted. Further, the apparatus 100 of FIG. 7 is not limited to the elements illustrated in FIG. 7.

The apparatus 700 generates the image of the object that includes a high resolution and in which noise is removed by performing a motion correction process on data obtained from the object. Examples of the image may include a medical image and a diagnostic image including information about the object. Also, examples of the apparatus 700 may include a PET device, a CT device, a PET/CT device, an SPECT device, and a SPECT/CT device.

The detector 105 detects measurement data from the object. For example, the detector 105 may detect radioactive rays passing through the object, or gamma rays emitted from the object.

The main system 710 performs the motion correction process on the data obtained from the object. For example, the main system 710 may include the sinogram generating unit 110, the ROI determining unit 120, the sinogram extracting unit 130, the motion information estimating unit 140, and the correction unit 150 of FIG. 1, and may further include the restoration unit 112 of FIG. 5.

The user input device 1141 and the output device 1142 may be examples of the user interface unit 114 of FIG. 5. For example, the user input device 1141 obtains, from a user, selection information that selects an ROI of the object, and the output device 1142 displays a first image, a second image, and/or a corrected image. Although the user input device 1141 and the output device 1142 are illustrated as separate devices in FIG. 7, the example is not limited thereto, and the user input device 1141 and the output device 1142 may be integrated into one device.

The storage device 720 stores data used to operate the apparatus 700, and data generated when the apparatus 700 operates. For example, the storage device 720 may include a storage medium.

According to the teachings above, there is provided a motion correction process of efficiently removing noise due to a motion of an object from data obtained from the object.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, configured to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments configured to accomplish the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating an image, the method comprising:
   a processor performing operations of:
   generating a first sinogram for a state of an object from among states of the object based on a motion of the object, and a second sinogram for the states, based on data obtained from the object; determining a region of interest (ROI) of the object based on the first sinogram; extracting, from the second sinogram, third sinograms corresponding to the ROI; estimating motion information of the ROI based on the third sinograms; and correcting the data based on the motion information.

2. the method of claim 1, further comprising: comparing sinograms corresponding to different states of the object, from among the third sinograms, to estimate the motion information.

3. the method of claim 1, further comprising: extracting, from the third sinograms, an eleventh sinogram corresponding to a first state of the object from among the states, and comprising a first coordinate value in a third direction; extracting, from the third sinograms, a twelfth sinogram corresponding to a second state of the object from among the states, and comprising the first coordinate value; and comparing the eleventh sinogram with the twelfth sinogram to estimate first motion information of the ROI in a first direction and a second direction.

4. the method of claim 3, further comprising: obtaining, from the eleventh sinogram, an eleventh position information of the ROI that comprises a brightest point from among points corresponding to a first projection angle, and a brightest point from among points corresponding to a second projection angle that comprises a difference of 90.degree. from the first projection angle; obtaining, from the twelfth sinogram, a twelfth position information of the ROI that comprises a brightest point from among points corresponding to the first projection angle, and a brightest point from among points corresponding to the second projection angle; and comparing the eleventh position information with the twelfth position information to estimate the first motion information.

5. the method of claim 4, further comprising: obtaining, from the eleventh sinogram, eleventh pieces of position information of the ROI based on projection angle pairs, each of which comprising a difference of 90.degree therebetween; obtaining the eleventh position information based on the eleventh pieces of position information; obtaining, from the twelfth sinogram, twelfth pieces of position information of the ROI based on the projection angle pairs; and obtaining the twelfth position information based on the twelfth pieces of position information.

6. the method of claim 1, further comprising: extracting, from the third sinograms, a twenty-first sinogram corresponding to a first state of the object from among the states; extracting, from the third sinograms, a twenty-second sinogram that is the most similar to the twenty-first sinogram from among sinograms corresponding to states of the object other than the first state from among the states; and comparing the twenty-first sinogram with the twenty-second sinogram to estimate second motion information of the ROI in a third direction.

7. the method of claim 6, further comprising: comparing a coordinate value of the twenty-first sinogram in the third direction with a coordinate value of the twenty-second sinogram in the third direction.

8. the method of claim 1, further comprising: determining the ROI based on a first image restored from the first sinogram.

9. the method of claim 8, further comprising: determining the ROI based on selection information input from a user who views the first image.

10. the method of claim 8, further comprising: automatically determining the ROI based on image values of pixels constituting the first image.

11. the method of claim 1, wherein the third sinograms comprise a stack of two-dimensional (2D) sinograms for the states.

12. the method of claim 1, further comprising: obtaining a signal indicating time information about each of the states; and generating the first sinogram based on data corresponding to a time at which the signal comprises a predetermined phase from among the data obtained from the object.

13. the method of claim 1, further comprising: generating sinograms corresponding times measured at predetermined time intervals; and generating the first sinogram based on a predetermined number of sinograms whose similarities are high from among the sinograms.

14. a non-transitory computer-readable storage medium storing a program comprising instructions to cause a computer to perform the method of claim 1.

15. An apparatus configured to generate an image, the apparatus comprising:

a sinogram generating unit configured to generate a first sinogram for a state of an object from among states of the object based on a motion of an object, and a second sinogram for the states, based on data obtained from the object;

a region of interest (ROI) determining unit configured to determine an ROI of the object based on the first sinogram;

a sinogram extracting unit configured to extract, from the second sinogram, third sinograms corresponding to the ROI;

a motion information extracting unit configured to estimate motion information of the ROI based on the third sinograms; and a correction unit configured to correct the data based on the motion information.

16. The apparatus of claim 15, wherein the motion information estimating unit is further configured to compare sinograms corresponding to different states of the object from among the third sinograms, to estimate the motion information.

17. The apparatus of claim 15, wherein the motion information estimating unit is further configured to:

extract, from the third sinograms, an eleventh sinogram corresponding to a first state of the object from among the states, and comprising a first coordinate value in a third direction;

extract, from the third sinograms, a twelfth sinogram corresponding to a second state of the object from among the states, and comprising the first coordinate value; and compare the eleventh sinogram with the twelfth sinogram to estimate first motion information of the ROI in a first direction and a second direction.

18. The apparatus of claim 15, wherein the motion information estimating unit is further configured to:

extract, from the third sinograms, a twenty-first sinogram corresponding to a first state of the object from among the states;

extract, from the third sinograms, a twenty-second sinogram that is the most similar to the twenty-first sinogram from among sinograms corresponding to states of the object other than the first state from among the states; and compare the twenty-first sinogram with the twenty-second sinogram to estimate second motion information of the ROI in a third direction.

19. The apparatus of claim 15, wherein the ROI determining unit is further configured to:

determine the ROI based on a first image restored from the first sinogram.

* * * * *